United States Patent [19]

Slabinski et al.

[11] Patent Number: 5,610,845
[45] Date of Patent: Mar. 11, 1997

[54] MULTI-PARAMETER AIR DATA SENSING TECHNIQUE

[75] Inventors: Robert J. Slabinski, Unionville; Richard C. Filipkowski, Glastonbury, both of Conn.

[73] Assignee: United Technologies Corporation, Hartford, Conn.

[21] Appl. No.: 298,456

[22] Filed: Aug. 30, 1994

[51] Int. Cl.$^6$ ........................................ G01P 3/00
[52] U.S. Cl. ................... 364/565; 364/558; 73/178 H; 73/182
[58] Field of Search .................... 364/565, 558, 364/571.02, 571.03, 424.01, 424.06; 324/160, 166; 73/182, 178 H; 244/17.13; 416/31

[56] References Cited

U.S. PATENT DOCUMENTS

| | | |
|---|---|---|
| 3,332,282 | 7/1967 | Daw . |
| 3,400,584 | 9/1968 | Beilman . |
| 3,617,721 | 11/1971 | Foster .................................. 235/150.2 |
| 3,726,139 | 4/1973 | Beilman . |
| 4,065,957 | 1/1978 | Beilman . |
| 4,074,570 | 2/1978 | Beilman et al. . |
| 4,360,888 | 11/1982 | Onksen et al. . |
| 4,893,261 | 1/1990 | Flint, III et al. . |
| 5,335,177 | 8/1994 | Boiteau et al. .................... 364/424.06 |

FOREIGN PATENT DOCUMENTS 2243912 11/1991 United Kingdom .

OTHER PUBLICATIONS

"Lift, Butterflies, and Myths About Bernoulli", D. Sheahan, *Radio Control Modeler Magazine*, Dec. 1991, pp. 178, 180.

*Primary Examiner*—Ellis B. Ramirez
*Assistant Examiner*—M. Kemper
*Attorney, Agent, or Firm*—Francis J. Maguire, Jr.

[57] ABSTRACT

Static pressure sensing and free airstream temperature sensing is obviated in a method for determining aircraft velocity relative to an airmass by utilizing a static pressure and temperature component present in pressure variations sensed by a total pressure sensor located on a rotating arm mounted on the fuselage of an aircraft. A harmonic analysis of a quasi-sinusoidal total pressure variation includes a determination of steady state and both first and second harmonic components. These harmonic components are used to determine the static pressure, the free airstream temperature and the aircraft airspeed without separately sensing these parameters.

16 Claims, 7 Drawing Sheets

MULTI-PARAMETER AIR DATA SENSING TECHNIQUE

TECHNICAL FIELD

This invention relates to determining parameters of an aircraft by interpreting a signal indicative of pressure variations positioned on a rotating member and, more particularly, determining aircraft air speed among other selected parameters.

BACKGROUND OF THE INVENTION

Early aircraft speed sensors placed a pressure sensor on a rotating arm and interpreted the pressure variations resulting as a result of aircraft movement through an air mass by assuming that the pressure sensed on the rotating arm was a pure sinusoid. See, for example, U.S. Pat. No. 4,360,888 to Onksen et al and U.S. Pat. No. 3,332,282 to Daw. Other rotating pressure sensing devices are disclosed by Beilman in U.S. Pat. Nos. 3,400,584; 3,726,139; 4,065,957 and 4,074,570.

U.S. Pat. No. 4,893,261, on the other hand, assumed that the pressure samples taken from a position on the rotor were only quasi-sinusoidal and demonstrated that a performance improvement would be obtained by performing a Fourier analysis on the pressure samples. Based on the Fourier extraction and use of the steady state (DC) and first harmonic Fourier terms from the sensed total pressure, a sensed static pressure, a sensed free air stream temperature, a sensed reference indicative of the blade passing a reference position, and a sensed reference signal indicative of rotor velocity were all used to produce a more accurate determination of aircraft direction and velocity. The Fourier analysis was carried out in a discrete manner and was performed on the sensed total pressure signals using a plurality of sub-revolution pressure samples that could be averaged over each subrevolution interval.

The above prior art required the direct measurement of three air data parameters: static pressure ($P_S$), total pressure ($P_T$) and free air stream temperature ($T_{FAT}$) in order to determine the air speed velocity ($V_A$) of an aircraft.

DISCLOSURE OF INVENTION

The present invention describes a method and means to determine the aircraft's velocity ($V_A$) using only one air data sensor to measure the total pressure ($P_T$) on a rotating member. The present invention also shows means and method to indirectly determine the static pressure ($P_S$) and the free air stream temperature ($T_{FAT}$) from the sensed total pressure ($P_T$). The present invention also shows, for a helicopter embodiment, determining aircraft direction using the only one air data sensor to measure the total pressure.

An object of the present invention is therefore to reduce the number of sensors required in determining aircraft velocity using harmonic analysis techniques on pressure samples taken from a position on an attached rotating member.

It is therefore also an object of the present invention to determine static pressure from the harmonic analysis of the pressure variations without having to sense static pressure directly.

It is therefore another object of the present invention to determine free air stream temperature from the harmonic analysis of the pressure variations without having to sense temperature directly.

It is still another object of the present invention, for helicopter embodiments, to determine the direction of aircraft velocity with respect to a fuselage referent such as the longitudinal axis of the aircraft.

According to the present invention, a method of processing a sensed total pressure signal by extracting its harmonic component signals provides a way to directly determine aircraft velocity without having to sense the static pressure or any other parameter directly.

In further accord with the present invention, a method of processing a sensed total pressure signal by extracting its harmonic component signals provides a way to directly determine aircraft velocity without having to sense the free air stream temperature or any other parameter directly.

In still further accord with the present invention, a method of processing a sensed total pressure signal by extracting its harmonic component signals provides a way to directly determine aircraft direction without having to sense the static pressure or any other parameter directly.

According further to the present invention, the harmonic signals used for determining aircraft velocity are the steady state, first harmonic and second harmonic components of the sensed total pressure signal.

In still further accord with the present invention, the static pressure and free air stream temperature can also be determined from the steady state, first and second harmonic components of the sensed pressure signal. The present invention provides an indirectly determined static pressure and free air stream temperature signal without the need of a separate static pressure sensor and temperature sensor to directly sense these parameters as is necessary in the prior art.

In accordance still further with the present invention, the direction of aircraft velocity with respect to a referent such as the longitudinal axis of the aircraft in a helicopter application can be determined using first harmonic quadrature components, as in the prior art.

These and other objects, features and advantages of the present invention will become more apparent in light of the following detailed description of a best mode embodiment thereof, as illustrated in the accompanying drawing.

BEST MODE FOR CARRYING OUT THE INVENTION

Figure 1:
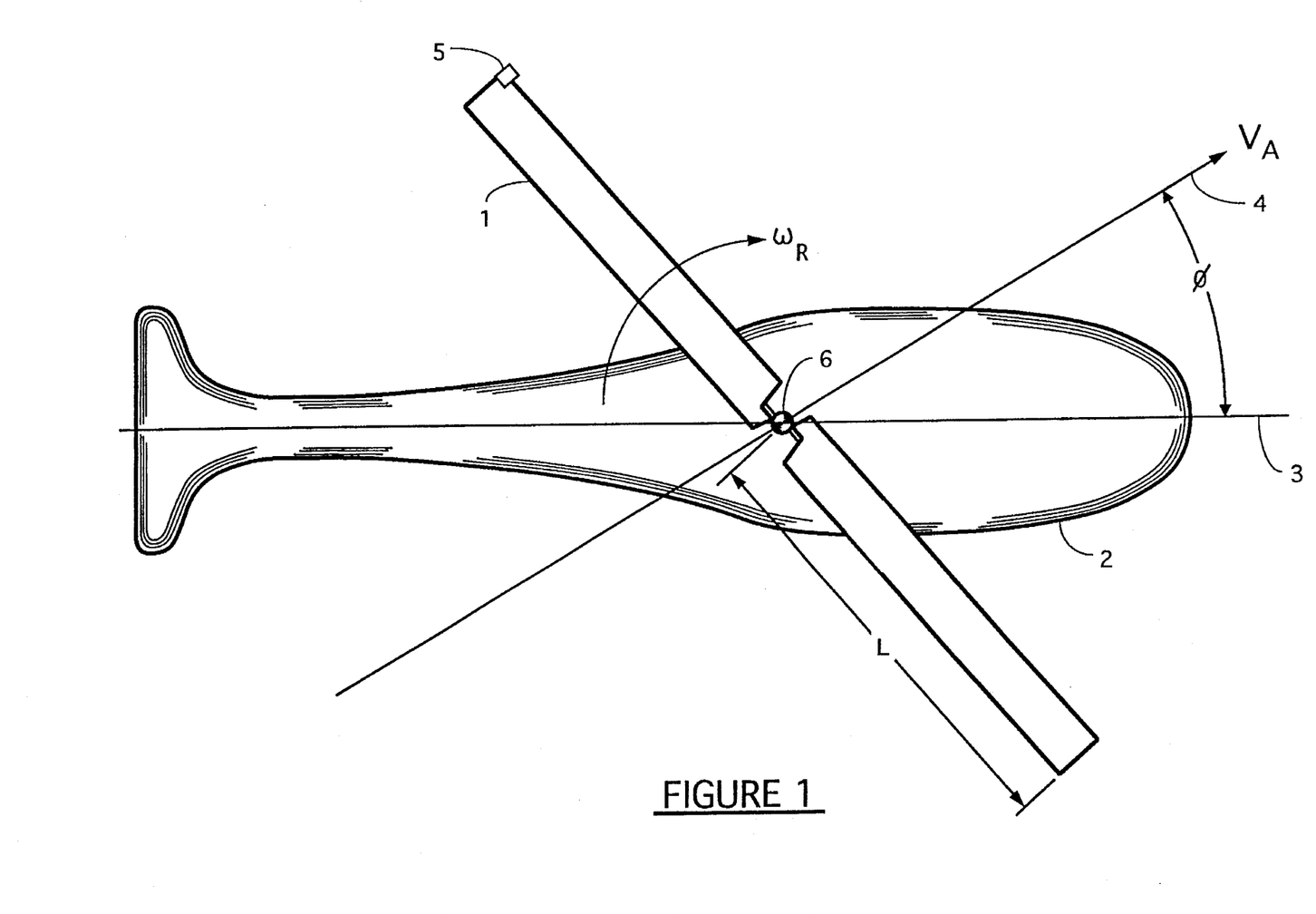
FIG. 1 shows a rotating pressure sensor coordinate system, according to the present invention.

FIG. 1 shows part 1 of a helicopter rotor rotating at an angular velocity $\omega_R$ upon a helicopter fuselage 2 having a longitudinal axis 3 wherein the fuselage 2 is in motion relative to an airmass in a direction having an angle $\phi$ relative to the longitudinal axis 3 at a velocity $V_A$ illustrated by a vector 4. A pressure sensor 5 may be mounted at a position on the rotor part 1 at a distance L from a point of rotation 6. The invention is not restricted to helicopter applications and may be used in conjunction with any rotating member. The sensor need not be at the end of the rotating member or rotor.

Figure 2:
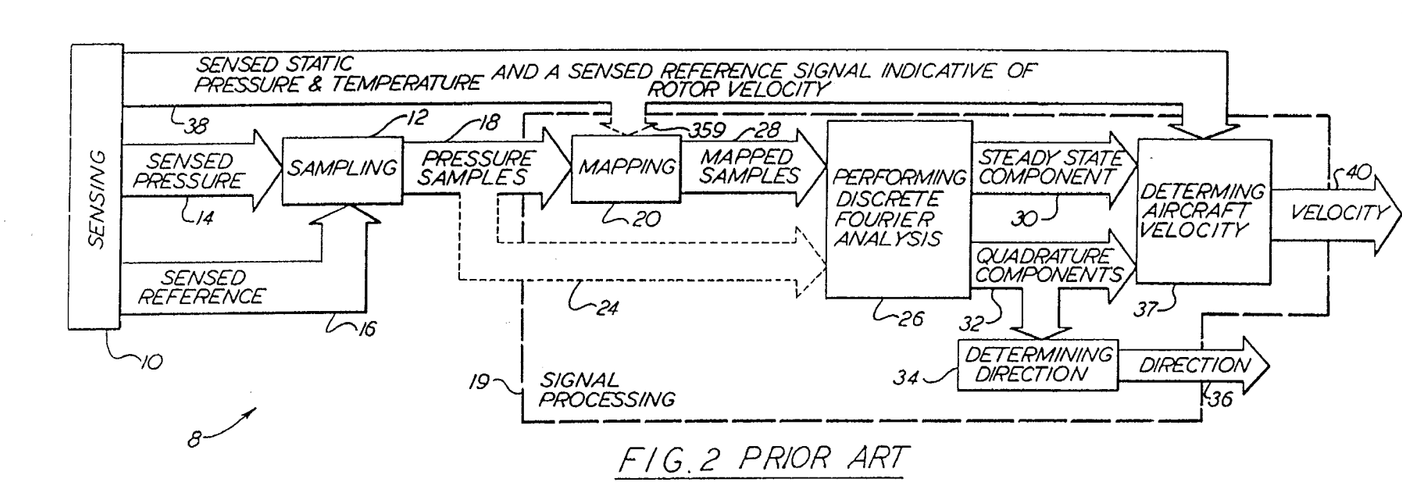
FIG. 2 shows a prior art method of determining aircraft velocity based on performance of a discrete Fourier analysis on sampled pressure signals taken from a position on a rotating arm.

It is known from U.S. Pat. No 4,893,261 that the pressure along the blade or rotating member produces a time varying total pressure reading (PT) proportional to the steady state velocity of the rotor plus or minus the velocity of the aircraft, as described by Equation (1) below, depending on the instantaneous relative position of the sensor 5 with respect to the position of the vector 4. It was an important teaching of the abovementioned patent that the air speed measurement could be much improved by first realizing that the waveform of the pressure variations is a quasi-sinusoid. The quasi-sinusoidal pressure output is due to a nonlinear relationship between velocity and pressure as described by Bernoulli's equation of compressible flow. The combined $V_R$ and $V_A$ produce a first and second harmonic of the rotor frequency. Only the magnitude of the first harmonic is proportional to the air speed. This led to the realization that a more accurate interpretation of its amplitude and phase variations would result from a Fourier analysis. An embodiment of the above method was shown carried out in a discrete manner as taught in detail therein. Such a prior art method 8 is shown in FIG. 2 wherein a number of parameters, including static pressure, were sensed in a step 10 and signals having magnitudes indicative thereof provided. These are sampled as indicated in a step 12 for use in subsequent steps. A sensed pressure signal such as would be provided from the pressure sensor 5 of FIG. 1 on the rotating member is provided on a line 14. This is the quasi-sinusoid referred to above whose amplitude will increase with increasing aircraft velocity relative to an airmass through which the aircraft is proceeding, as suggested in FIG. 1. For zero velocity with respect to the airmass, as in a hovering helicopter, the pressure varying sinusoid has zero amplitude and a steady state value (PTSS) due to the rotation of the rotating member with respect to the airmass which is greater than the static pressure (PS).

According further to the prior art of FIG. 2, pressure samples may be taken several times per revolution of the rotating member and pressure sample signals are provided on a line 18. These samples then undergo a signal processing step 19 to determine direction and velocity. A mapping step 20 to compensate the sensor for known sources of sensor error is illustrated within the signal processing step 19 although, such a mapping step 20 need not necessarily be present, i.e., sensor dependent pressure samples may be provided directly, without compensation, as suggested by signal line 24 provided in lieu of step 20. It may or may not be desirable, as the case may be, to have the mapping step 20 perform certain nonlinear operations on the pressure samples on line 18 in order to get a more accurate estimate of the true pressure prior to performing the discrete Fourier analysis in step 26. The mapping step 20 may instead be thought of as performing a simple operation on the signals on the line 18 prior to being provided to a Fourier analysis step 26. These mapping functions may include a two-sevenths root mapping step for implementing an exact solution of Bernoulli's equation of compressible flow. In any event, mapped sample signals may be provided on a line 28 and the discrete Fourier analysis may then be performed on these mapped samples. On the other hand, the mapping step may simply be left out so that the signals on line 18 are the same as, or, if merely linearly scaled in the step 20, essentially the same as, those on line 28.

In any event, whether the pressure samples on line 18 are mapped in step 20 or not, according to the prior art, a discrete Fourier analysis is performed on the pressure samples in the step 26 in which the result is to provide the magnitude of the steady state (PTSS) component of the sensed total pressure signal on a line 30 and a pair of first harmonic quadrature component signals on a line 32.

The first harmonic quadrature component signals on line 32 are used to determine aircraft direction relative to the airmass with respect to a frame of reference fixed in the aircraft as shown in a step 34. A direction signal on a line 36 is provided as an output of the signal processing step 19. This is explained in detail in connection with FIGS. 4 and 5 of U.S. Pat. No. 4,893,261 at column 11, line 20 through column 12, line 14 which is hereby incorporated by reference as background information.

The first harmonic quadrature component signals on line 32 are also provided, according to the prior art, along with the steady state component signal on line 30, for determining aircraft velocity relative to the airmass as indicated in a step 37, which may be done by means of a Binomial expansion of Bernoulli's equation of compressible flow, constituting an approximating equation relating the resultant of the two quadrature components, the steady state component, the sensed static temperature and the sensed static pressure. One or both static pressure and temperature signals on a line 38 may be utilized at this step, according to the prior art, depending on whether they were used in the mapping step 20. The result of the determination of step 37 is to provide a velocity signal on a line 40 having a magnitude indicative of the aircraft's velocity with respect to the airmass using sensed pressure on the rotating member, sensed static pressure and sensed temperature.

As known in the art of signal analysis, a periodic function can be represented as a convergent Fourier series as shown in the equations in column 7 of U.S. Pat. No. 4,893,261 at lines 12–68 which teaches that harmonics occurring at multiples of the frequency of rotation of the rotating member are related to airspeed but the first harmonic and the steady state components contain most of the useful airspeed information. Consequently, the teachings of the prior art show a Fourier series representation of the input pressure signal by a discrete Fourier series having a steady state component (A0) and a first harmonic component (PT1) made up of the square root of the sum of the squares of the quadrature components (A1, B1).

This technique of using the first harmonic term from the Fourier expansion, according to the above mentioned U.S. Pat. No. 4,893,261, provides a means to accurately resolve lower airspeed measurements than was previously possible. This approach is still valid and, as in prior art air data measurement techniques, requires the measurement of rotor speed, local static air pressure and static air temperature to compute the aircraft's airspeed.

The present invention improves that technique by optimizing all of the data contained in the Fourier expansion of the sensed total pressure and provides a means to obtain the airspeed, local static pressure and static temperature without the need of separate sensors.

This may be accomplished by the use of a binomial expansion of the pressure terms of Bernoulli's equation of compressible flow.

The pressure input to the sensor mounted on a rotating member as shown in FIG. 1 is described by Bernoulli's equation of compressible flow to be $$PT = PS[1 + KV^2]^{\frac{\gamma}{\gamma-1}} \quad \text{Eq. (1)}$$

where $$K = \frac{(\gamma - 1)}{(\gamma) 2 g RT} \quad \text{Eq. (2)}$$

and where $V = V_R + V_A \sin(\omega_R t + \phi)$ $V_R = 2\pi f_R L$: rotating velocity at sensor (ft/sec)

$f_R$=frequency of rotating member (cycles/sec)

L=distance of sensor from center of rotation (feet)

$\gamma$=ratio of specific heat of air at constant pressure to specific heat at constant volume (1.4)

g=gravity constant (32.2 ft/sec$^2$)

R=universal gas constant (53.3 ft/°R)

T=free airstream absolute temperature (degrees Rankin)

PS=local static air pressure (#/in$^2$)

PT=total pressure (#/in$^2$)

Rearranging Bernoulli's equation, inserting the total sensed velocity and reducing the trigonometric terms to first order harmonics yields:

$$\left[\frac{PT}{PS}\right]^{\frac{\gamma-1}{\gamma}} = 1 + K\left(V_R^2 + \frac{V_A^2}{2}\right) + \quad \text{Eq. (3)}$$
$$2 V_R V_A K \sin(\omega_R t + \phi_1) - \frac{V_A^2}{2} K \cos(2\omega_R t + 2\phi_2)$$

The right side of equation (3) gives the ratio metric increase in static pressure due to the combined effects of the magnitude of the rotating member's velocity ($V_R$) and the aircraft's airspeed ($V_A$). The velocities seen by the pressure sensor consist of a steady state component (DC term) a first harmonic and second harmonic of the rotating member's frequency; therefore, the total pressure sensor's output, PT, has the same frequency components. Subjecting the total sensed pressure output to a Fourier analysis will result in PT having the following terms:

$$PT = PTSS + PT1 \sin(\omega_R t + \phi_1) + (-PT2) \cos(2\omega t + 2\phi_2) \quad \text{Eq. (4)}$$

where

PTSS=steady state (DC) term,

PT1=first harmonic term,

PT2=second harmonic term.

Inserting equation (4) into equation (3) and rearranging terms result in $$\left[\frac{PTSS}{PS}\right]^{\frac{\gamma-1}{\gamma}} [1+X]^{\frac{\gamma-1}{\gamma}} = 1 + K\left(V_R^2 + \frac{V_A^2}{2}\right) + \quad \text{Eq. (5)}$$
$$2 K V_R V_A \sin(\omega_R t + \Phi_1) = \frac{K V_A^2}{2} \cos(2\omega_R t + 2\phi_2)$$

where $$X = \left[\frac{PT1}{PTSS} \sin(\omega_R t + \phi_1) + \frac{PT2}{PTSS} \cos(2\omega_R t + 2\phi_2)\right]$$

Collecting the like steady state (DC), first and second harmonic terms of this expansion and equating them to the same harmonic terms of the velocity input components of Bernoulli's equation results in three simultaneous, statistically independent equations as shown below as Equations 6, 7 and 8. These three equations provide a means to solve for any three unknowns contained within these equations. It should be noted that the Binomial expansion converges very rapidly and that only a few terms need to be evaluated to obtain good accuracy. The basic unknowns contained in Bernoulli's equation, which are needed for air data systems, are the airspeed ($V_A$), static pressure ($P_S$) and free airstream temperature ($T_{FAT}$). The rotor velocity ($V_R$) is also unknown in the below equations but is not an air data parameter and is easily measured. The result of the solution of these three simultaneous equations is to provide the velocity signal 40 of FIG. 2 without having to sense static pressure and temperature.

Applying the Binomial expansion to the second term on the left hand side of the Bernoulli equation (5), and then reducing the trigonometric terms to first order harmonic components results in Equation (5A) below:

$$\left[\frac{PTSS}{PS}\right]^{\frac{\gamma-1}{\gamma}} [C_0 + C_1 \sin(\omega_R t + \phi_1) + C_2 \cos2(\omega_R t + \quad \text{Eq. (5A)}$$
$$\phi_2) + \ldots] = 1 + K(V_R^2 + .5 V_A^2) +$$
$$2 KV_R V_A \sin(\omega_R t + \phi_1) - 0.5 KV_A^2 \cos2(\omega_R t + \phi_2)$$

Equating equivalent harmonic terms on the left and right hand sides of equation (5A) results in the following three simultaneous equations:

$$\left[\frac{PTSS}{PS}\right]^{\frac{\gamma-1}{\gamma}} C_0 = 1 + K\left(V_R^2 + \frac{V_A^2}{2}\right) \ldots DC \text{ term} \quad \text{Eq. (6)}$$

$$\left[\frac{PTSS}{PS}\right]^{\frac{\gamma-1}{\gamma}} C_1 = 2 K V_R V_A \ldots \text{first harmonic} \quad \text{Eq. (7)}$$

$$\left[\frac{PTSS}{PS}\right]^{\frac{\gamma-1}{\gamma}} C_2 = \frac{-KV_A^2}{2} \ldots \text{second harmonic} \quad \text{Eq. (8)}$$

where $$C_0 = 1 - \frac{1}{4}\left(\frac{\gamma-1}{\gamma^2}\right)\left(\left(\frac{PT1}{PTSS}\right)^2 + \left(\frac{-PT2}{PTSS}\right)^2\right) - \quad \text{Eq. (9)}$$
$$\frac{1}{8}\left(\frac{\gamma-1}{\gamma^2}\right)\left(\frac{\gamma+1}{\gamma}\right)\left(\frac{PT1}{PTSS}\right)^2\left(\frac{-PT2}{PTSS}\right) -$$

-continued $$\frac{1}{64}\left(\frac{\gamma-1}{\gamma^2}\right)\left(\frac{\gamma+1}{\gamma}\right)\left(\frac{2\gamma+1}{\gamma}\right)\left[\left(\frac{PT1}{PTSS}\right)^4 + 2\left(\frac{PT1}{PTSS}\right)^2\left(\frac{-PT2}{PTSS}\right)^2 + \left(\frac{-PT2}{PTSS}\right)^4\right] -$$

$$\frac{1}{96}\left(\frac{\gamma-1}{\gamma^2}\right)\left(\frac{\gamma+1}{\gamma}\right)\left(\frac{2\gamma+1}{\gamma}\right)\left(\frac{3\gamma+1}{\gamma}\right)$$

$$C_1 = \left(\frac{\gamma-1}{\gamma}\right)\frac{PT1}{PTSS}\left[1+\left(\frac{1}{2}\right)\left(\frac{1}{\gamma}\right)\left(\frac{-PT2}{PTSS}\right) + \left[\left(\frac{PT1}{PTSS}\right)^4\left(\frac{-PT2}{PTSS}\right) + \frac{3}{2}\left(\frac{PT1}{PTSS}\right)^2\left(\frac{-PT2}{PTSS}\right)^3\right]\right] \quad \text{Eq. (10)}$$

$$\frac{1}{8}\left(\frac{1}{\gamma}\right)\left(\frac{\gamma+1}{\gamma}\right)\left(\frac{PT1}{PTSS}\right)^2 + 2\left(\frac{-PT2}{PTSS}\right)^2\right] +$$

$$\frac{1}{12}\left(\frac{1}{\gamma}\right)\left(\frac{\gamma+1}{\gamma}\right)\left(\frac{2\gamma+1}{\gamma}\right)\left[\left(\frac{PT1}{PTSS}\right)^2\left(\frac{-PT2}{PTSS}\right) + \frac{3}{4}\left(\frac{-PT2}{PTSS}\right)^3\right] +$$

$$\frac{1}{192}\left(\frac{1}{\gamma}\right)\left(\frac{\gamma+1}{\gamma}\right)\left(\frac{2\gamma+1}{\gamma}\right)\left(\frac{3\gamma+1}{\gamma}\right)\left[\left(\frac{PT1}{PTSS}\right)^5 + 7\left(\frac{PT1}{PTSS}\right)^3\left(\frac{-PT2}{PTSS}\right)^2 + 3\left(\frac{PT1}{PTSS}\right)\left(\frac{-PT2}{PTSS}\right)^4\right] +++ \right]$$

$$C_2 = \left(\frac{\gamma-1}{\gamma}\right)\left(\frac{-PT2}{PTSS}\right) + \frac{1}{4}\left(\frac{\gamma-1}{\gamma^2}\right)\left(\frac{PT1}{PTSS}\right)^2 + \quad \text{Eq. (11)}$$

$$\frac{1}{4}\left(\frac{\gamma-1}{\gamma^2}\right)\left(\frac{\gamma+1}{\gamma}\right)\left[\left(\frac{PT1}{PTSS}\right)^2\left(\frac{-PT2}{PTSS}\right) + \frac{1}{2}\left(\frac{-PT2}{PTSS}\right)^3\right] +$$

$$\frac{1}{48}\left(\frac{\gamma-1}{\gamma^2}\right)\left(\frac{\gamma+1}{\gamma}\right)\left(\frac{2\gamma+1}{\gamma}\right)\left[\left(\frac{PT1}{PTSS}\right)^4 + \frac{9}{4}\left(\frac{PT1}{PTSS}\right)^2\left(\frac{-PT2}{PTSS}\right)^2\right] +$$

$$\frac{7}{384}\left(\frac{\gamma-1}{\gamma^2}\right)\left(\frac{\gamma+1}{\gamma}\right)\left(\frac{2\gamma+1}{\gamma}\right)\left(\frac{3\gamma+1}{\gamma}\right)\left[\left(\frac{PT1}{PTSS}\right)^4\left(\frac{-PT2}{PTSS}\right) + \frac{12}{7}\left(\frac{PT1}{PTSS}\right)^2\left(\frac{-PT2}{PTSS}\right)^3 + \frac{2}{7}\left(\frac{-PT2}{PTSS}\right)^5\right] +++$$

The components of the "C" terms, the binomial coefficients, of equations 9, 10 and 11 consist of constants and powers of the three outputs PTSS, PT1 and PT2 from the Fourier analysis of the sensed total pressure. The series converges very rapidly and usually only a couple of terms are needed to get sufficient accuracy depending upon the magnitude of VR and VA in a given application.

For example, the original U.S. Pat. No. 4,893,261 performed a harmonic analysis of the sensed total pressure to extract the DC term (PTSS) and the first harmonic term (PT1). Equation (7), along with PS and temperature obtained from separate sensors, and only the first component of $C_1$ in Equation (10) was used to solve for the aircraft's speed as shown in Equation (12):

$$V_A = \left[\frac{PTSS}{PS}\right]^{\frac{\gamma-1}{\gamma}} \frac{\gamma gRT}{(\gamma-1)V_R} \quad C_1 = \left[\frac{PTSS}{PS}\right]^{\frac{\gamma-1}{\gamma}} \frac{PT1\,g\,RT}{PTSS\,V_R} \quad \text{Eq. (12)}$$

This provides numeric accuracies within 0.3% of current airspeed neglecting sensor accuracies.

The improvement to the original invention as taught herein eliminates the need for separate static pressure and temperature sensor measurements which is accomplished with only minor changes to the existing implementation.

The improvement over the original invention involves the additional determination of the second harmonic component (PT2) of the sensed pressure signal along with the currently determined steady state term (PTSS) and the first harmonic term (PT1). This is simply accomplished by solving the Fourier coefficient equation as shown on column 7 of the original U.S. Patent for n=2 and obtaining the $a_2$, $b_2$ and PT2 Fourier coefficients along with the $a_0$, $a_1$, $b_1$ and PTSS and PT1 coefficients given in equations 5, 6, 7 and 8 of U.S. Pat. No. 4,893,261. The additional discrete Fourier series coefficients are:

$$A_2 = a_2 = \frac{1}{\pi}\sum_{j=1}^{m} PT_j[\sin(j4\pi/m)\sin((4\pi/m)(j-1))] \quad \text{Eq. (13)}$$

$$B_2 = b_2 = \frac{1}{\pi}\sum_{j=1}^{m} PT_j[\cos((4\pi/m)(j-1)) - \cos(j4\pi/m)] \quad \text{Eq. (14)}$$

$$PT2 = (A_2^2 + B_2^2)^{1/2} \quad \text{Eq. (15)}$$

The addition of the second harmonic term, PT2, allows for a more accurate determination of the "C" coefficients given in equations 9, 10 and 11 and allows for the inclusion of a third equation [Equation (8)] which now more fully describes the sensed pressure components. The expansion of the algorithm which describes the pressure sensor output from the original patent's single equation to the full set of three simultaneous equations 6, 7 and 8 provides a means to evaluate any three unknowns contained in these equations such as $V_A$, PS, T or $V_R$. Since $V_R$ is easily measured, the three air data parameters will be solved.

This improvement to the original invention eliminates the need for a separate static air pressure sensor to obtain PS and a separate temperature sensor to obtain free air stream temperature.

Eliminating the $$\left[\frac{PTSS}{PS}\right]^{\frac{\gamma-1}{\gamma}}$$

term from Equations (7) and (8) results in the quadratic $$\frac{-KV_A^2}{2C_2} = \frac{2KV_RV_A}{C_1} \quad \text{Eq. (16)}$$

Solving for airspeed, $V_A$ yields:

$$V_A = -4V_R C_2/C_1 \quad \text{Eq. (17)}$$

It should be noted that, for purposes of this analysis which will be illustrated below, for $C_1 = C_2 = 0$ it is assumed that $V_A = 0$. Inserting the solution for $V_A$ obtained from equation (17) back into Equations (6) and (7) and solving for T and for PS results in the value for the local static air temperature and local static air pressure as shown in Equations (18) and (19) below:

$$T = \frac{-4(\gamma-1)V_R^2 C_2}{\gamma_g R C_1^2}\left[ C_0 + \frac{C_1^2}{8C_2} + C_2 \right] \quad \text{Eq. (18)}$$

$$P_s = PTSS\left[ C_0 + \frac{C_1^2}{8C_2} + C_2 \right]^{\gamma/\gamma-1} \quad \text{Eq. (19)}$$

Figure 3:
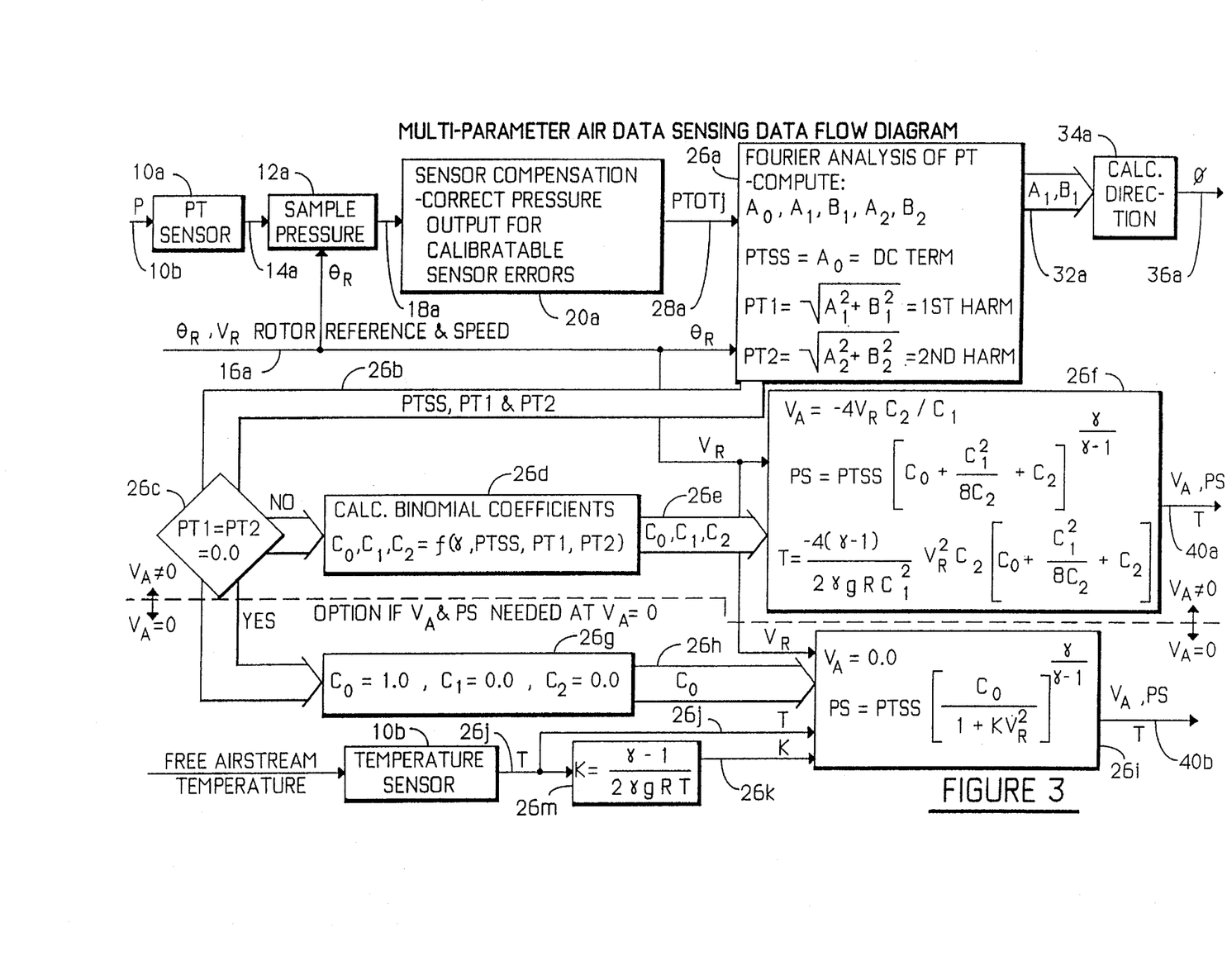
FIG. 3 shows a detailed illustration of a method, according to the present invention, for determining aircraft velocity and direction, static pressure and free air stream temperature, all from a sensed pressure signal.

The general solution of the three simultaneous equations, which yielded the three air data parameters given in Equations (17), (18) and (19), requires that both rotor velocity ($V_R$) and airspeed velocity ($V_A$) be present. This is the normal mode of operation for aircraft and the mode where the most air data information is obtained with the minimum number of sensors. The data flow for this operational mode is illustrated in the upper section of FIG. 3, i.e., above a dashed line. FIG. 3 shows the teachings of the present invention but has its steps with reference numerals labelled similarly to FIG. 2 to assist the reader in understanding the invention in the context of the prior art. FIG. 3 shows a pressure sensor 10a mounted on the rotating member and responsive to pressure variations on a line 10b. It provides a sensed pressure signal on a line 14a which are sampled in a sample step 12a referenced to a rotor reference ($\theta_R$) and rotor velocity ($V_R$) as indicated by a signal line 16a. Pressure samples on a line 18a are provided and may be evaluated in a step 20a in which sensor compensation may be carried out in order to correct known errors in the sensor so that the pressure output is corrected for such known errors. Corrected samples are provided on a line 28a for evaluation in a step 26a which carries out a Fourier analysis of the pressure sample on the line 18a as corrected, if desired, in the step 20a. Unlike the step 26 of the prior art shown in FIG. 2, step 26a of FIG. 3 calculates PT2, i.e., the second harmonic, as described above. Similar to FIG. 2, however, the A1 and B1 terms may be provided as shown on a line 32a to a direction calculation step 34a for providing a direction signal on a line 36a.

The results of the step 26a are provided on a line 26b to a decision step 26c that is present because of a point of discontinuity that exists when $V_A=0.0$. This can occur when the system is in a helicopter and operating in a hover mode. As seen by equations (6) through (11), when $V_A=0.0$, $P_{T1}=P_{T2}=0.0$ it results in $C_0=1$ and $C_1=C_2=0.0$. It thus has the effect of reducing the number of statistically independent equations from three to two. The determination that $V_A=0$ can be made based on the fact that this is the only way that $P_{T1}$ and $P_{T2}$ can equal zero.

Assuming $V_A$ is not equal to zero, step 26c so determines and a step 26d is next carried out in which the Binomial coefficients $C_0$, $C_1$, $C_2$ are calculated as a function of $\gamma$, PTSS, PT1, PT2 as described above and are provided on a line 26e for use in a step 26f which is also responsive to the rotor speed signal on the line 16a. Step 26f computes aircraft velocity ($V_A$), static pressure ($P_S$) and free air stream temperature ($T_{FAT}$) which are provided on a line 40a as shown.

If, on the other hand, the step 26c determines that $V_A$ is equal to zero, then a step 26g indicates that the Binomial coefficients $C_1$ and $C_2$ are equal to zero and such is indicated by a signal on a line 26h to a step 26i which is also responsive to a sensed temperature signal on a line 26j and a calculated constant (K) signal on a line 26k, being a calculation in a step 26m of the constant shown in equation (2). It can be assumed that the temperature has not changed and will remain constant during hover.

If, on the other hand, the values for static pressure and temperature are deemed needed to be sensed in some way during the time $V_A$ equals zero, either a static pressure sensor or a temperature sensor can be added to the system. The option shown in FIG. 3 for achieving static pressure and temperature when the airspeed velocity is zero is to add a temperature sensor 10b in order to be in a position to carry out the calculation shown in step 26i for providing a signal on a line 40b similar to the signal on the line 40a for that condition.

In summary, the data from a single total pressure sensor can be analyzed using a harmonic analysis technique to produce three simultaneous equations from which air data information can be extracted. Equations 6, 7 and 8 can be solved simultaneously to obtain the sensors airspeed ($V_A$), the local static air pressure (PS) and the air temperature (T). These three parameters, all derived from the single pressure sensor, provide all the inputs necessary for determining all the air data parameters normally provided by a Central Air Data Computer.

Figure 4:
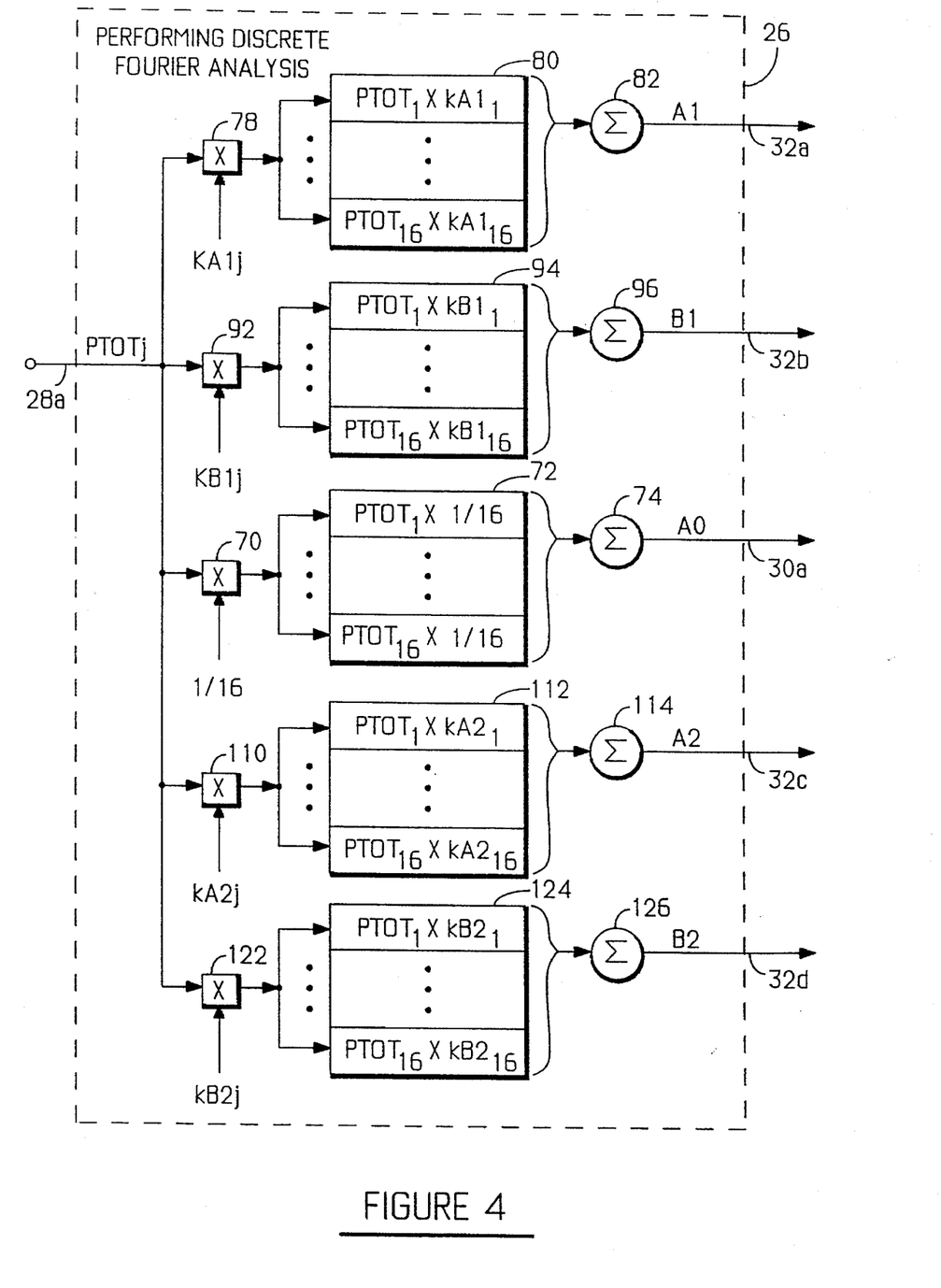
FIG. 4 shows the step 26 of FIG. 2 modified, according to the present invention, to provide a second harmonic calculation.

Referring now to FIG. 4, an improved method for performing the discrete Fourier analysis of step 26 of FIG. 2 is shown, according to the present invention. The discrete Fourier analysis step 26 of FIG. 4 of the present disclosure differs from the same step shown in FIG. 3 of U.S. Pat. No. 4,893,261 in that, in addition to providing a steady state (A0) component (PTSS) and first harmonic quadrature components (A1, B1), second harmonic quadrature components (A2, B2) are provided as well.

The present invention can be carried out, using the same sampling techniques described in U.S. Pat. No. 4,893,261 at column 6, line 61 through column 7, line 11, column 8, lines 1–11, column 8, line 67 through column 9, line 65 which are hereby incorporated by reference as background.

The mapped samples on line 28 of FIG. 2 may be represented, as shown in FIG. 4, by a signal line 28a on which is sequentially provided a series of total pressure samples ($PTOT_j$), each corresponding to a pressure sample taken during one of the subrevolution intervals. Each of these samples is multiplied in a step 70 by a factor of 1/m, e.g., 1/16, where m corresponds to the number of subrevolution intervals in one revolution. For the specific example, a sixteen register stack 72 is provided for storing sixteen successive total pressure samples, each multiplied by 1/16 prior to storage. Each time one of the registers is updated, a summation step may be performed, as indicated by a step 74, and a summed steady state component signal (A0) provided on a line 30a. Or, the entire stack may be updated once per revolution before the summation step 74 is performed. Other variations of timing for updates and summing are of course possible.

Figure 5:
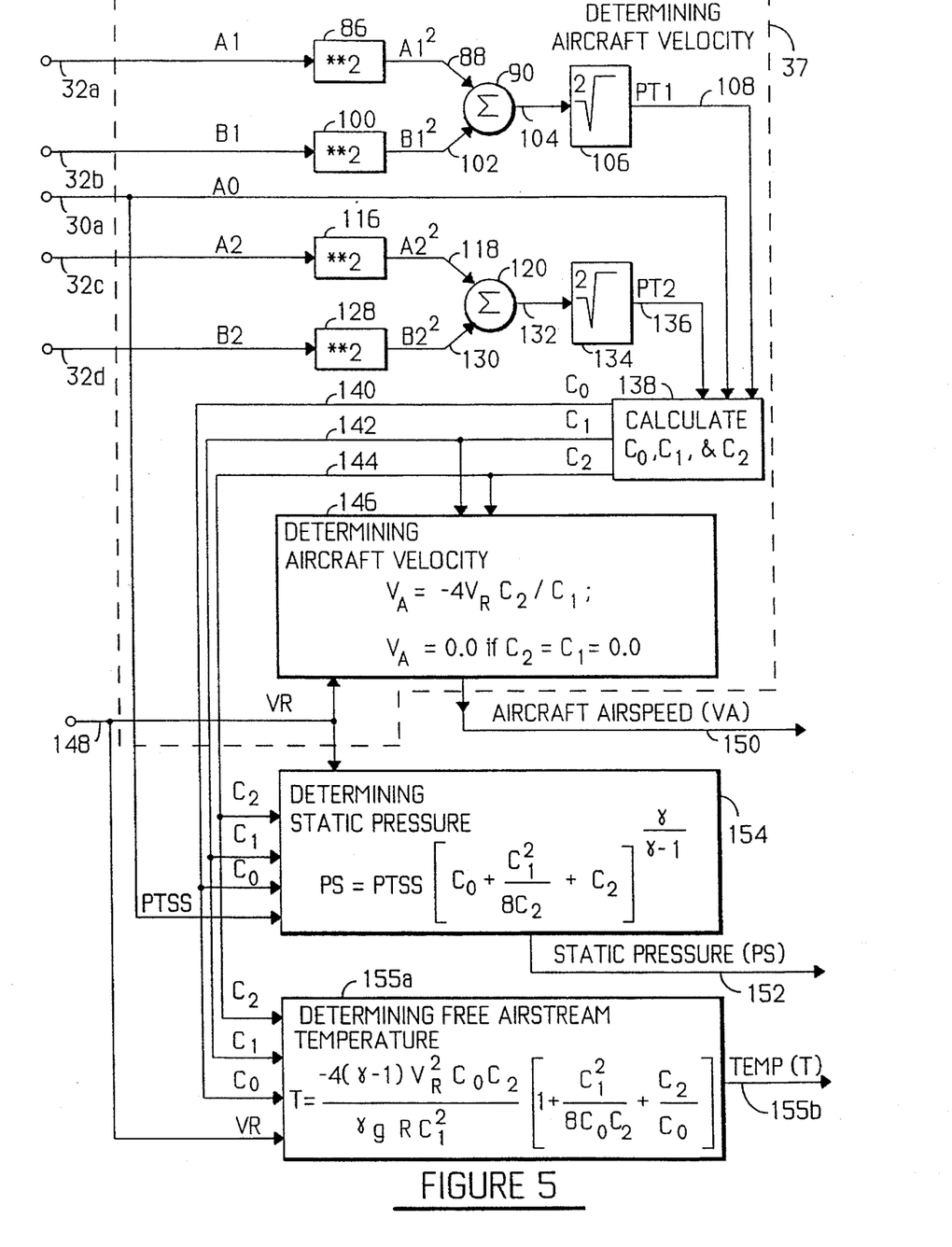
FIG. 5 shows the determination of aircraft velocity step 37 of FIG. 2 modified, according to the present invention, to include the second harmonic calculated as shown in FIG. 4 with further calculations for determining aircraft velocity without the need for sensing static pressure or free air stream temperature; it also shows that static pressure and free air stream temperature can be determined from these measurements alone, without having to sense them directly.

Each of the pressure samples on line 28a is also multiplied by a Fourier coefficient or weighting factor, $KA1_j$, in a step 78. The weighting factor $KA1_j$ corresponds to the average of the cos(nx) term in the $a_n$ equation (3) of U.S. Pat. No. 4,893,261 evaluated over the subrevolution interval of interest for the first harmonic. A stack 80 is kept up-to-date with the latest weighted pressure samples. As with the steady state stack 72, the stack 80 may be summed every time one of the registers is updated, may be summed only once every revolution of the rotating member, or summed at some other interval consistent with the summing intervals utilized in the other summing steps. In any event, after a summation step 82, a first harmonic quadrature component signal (A1) is provided on a line 32a. The quadrature signal on line 32a is squared as shown in FIG. 5 in a step 86 and a first squared signal is provided on a line 88 to a summation step 90.

The sampled signals of FIG. 4 on line 28a are also weighted in a separate step 92 by a Fourier weighting factor, KB1j. The weighting factor $KB1_j$ corresponds to the sin(nx) term in the $b_n$ equation (4) of U.S. Pat. No. 4,893,261 evaluated over the subrevolution interval of interest for the first harmonic. The weighted pressure samples are stored in a stack 94 and are summed in a step 96 each time a register is updated or once every revolution, or at some other interval, depending on design choice consistent with the other summing steps 74, 82. A second, first harmonic quadrature component signal (B1) is provided on a line 32b which is squared as shown in FIG. 5 in a step 100 in order to provide a second squared quadrature signal on a line 102, to be summed with the first squared quadrature signal on line 88 in step 90. A summed signal on a line 104 is then provided, and its square root is taken in a step 106 in order to provide a resultant first harmonic signal (PT1) on a line 108. The resultant signal is indicative of the magnitude of the first harmonic of the pressure variations occurring on the rotating member.

The description of FIG. 4 so far corresponds closely to that already disclosed in the prior art as shown in FIG. 3 of U.S. Pat. No. 4,893,261. According to the present invention, however, additional quadrature components (A2, B2) are provided on lines 32c, 32d in order to form a second harmonic component to be described subsequently in connection with FIG. 5.

Each of the pressure samples on line 28a is also multiplied, according to the present invention, by a Fourier coefficient or weighting factor, $KA2_j$, in a step 110. The weighting factor KA2j corresponds to the average of a cosine term in equation (3) of U.S. Pat. No. 4,893,261 evaluated over the subrevolution interval of interest for the second harmonic, i.e., $a_2$. A stack 112 is kept up-to-date with the latest weighted pressure samples. As with the stacks 72, 80, 94 described above, the stack 112 may be summed every time one of the registers is updated, may be summed only once every revolution of the rotating member, or summed at some other interval consistent with the summing intervals utilized in the other summing steps. In any event, after a summing step 114, a quadrature component signal A2 is provided on the line 32c. The quadrature signal on the line 32c is squared in a step 116 in FIG. 5 and a squared signal ($A2^2$) is provided on a line 118 for use in a summation step 120.

Similarly, the sampled signals on line 28a of FIG. 4 are also weighted in a separate step 122 by a Fourier weighting factor, $KB2_j$ that corresponds to the sine term in equation (4) of U.S. Pat. No. 4,893,261 evaluated over the subrevolution interval of interest for the second harmonic, i.e., $b_2$. The weighted pressure samples are stored in a stack 124 and are summed in a step 126 each time a register is updated or once every revolution, or at some other interval, depending on design choice consistent with the other summing steps 74, 82, 96, 114. A quadrature component signal (B2) is provided on the line 32d which is then squared in a step 128 of FIG. 5 in order to provide a squared quadrature signal on a line 130, to be summed with the quadrature signal on line 118 in the step 120 in order to provide a summed signal on a line 132. The square root of the signal on the line 132 is taken in a step 134 in order to provide a resultant signal (PT2) on a line 136. The resultant signal is indicative of the magnitude of the second harmonic of the pressure variations occurring on the rotating member.

It will of course be appreciated that FIGS. 3, 4 and 5 are system level diagrams of the signal manipulations which may take place, according to the present invention, in order to produce an aircraft airspeed signal from a sampled pressure signal. This may be implemented by means of a general purpose signal processor, a dedicated signal processor, a special purpose signal processor or the like, whether in the form of an integrated circuit, discrete components, or even a plurality of separate circuits, each performing separate functions. For example, the resolution of the quadrature signals into a resultant signal may be carried out by a separate circuit such as is disclosed in U.S. Pat. No. 3,584,783 to Kobori. All of this is a matter of design choice.

Referring back to FIG. 5, after providing the steady state, first and second harmonic signals (A0, PT1, PT2) on lines 30a, 108, 136, a step 138 is next executed in which the components $C_0$, $C_1$ and $C_2$ described in Equations (9–11) hereof are calculated and corresponding signals provided on line 140, 142, 144. Of these, $C_1$ and $C_2$ are used in a step 146 to determine aircraft velocity in accordance with Equation (17) hereof. In response to the signals on lines 142, 144 and also in response a rotor velocity signal on a line 148, an aircraft airspeed signal ($V_A$) on a line 150 is provided, similar to the aircraft velocity signal 40 provided in FIG. 3 of U.S. Pat. No. 4,893,261 except obtained without having to sense static pressure and temperature directly.

In fact, according further to the present invention, a static pressure signal can be provided on a line 152 by carrying out the equation shown in a step 154 according to Equation (19) hereof in response to the steady state pressure signal (PTSS), the factors $C_0$, $C_1$, $C_2$ and the rotor speed signal on the line 148.

An additional step 155a may be carried out, according further to the present invention, for determining a free airstream temperature as provided on a line 156b in response to the $C_0$, $C_1$, $C_2$, $V_R$ signals on the lines 140, 142, 144 and 148 using equation (18) and stored atmospheric constants (γ, g, R).

Figure 6:
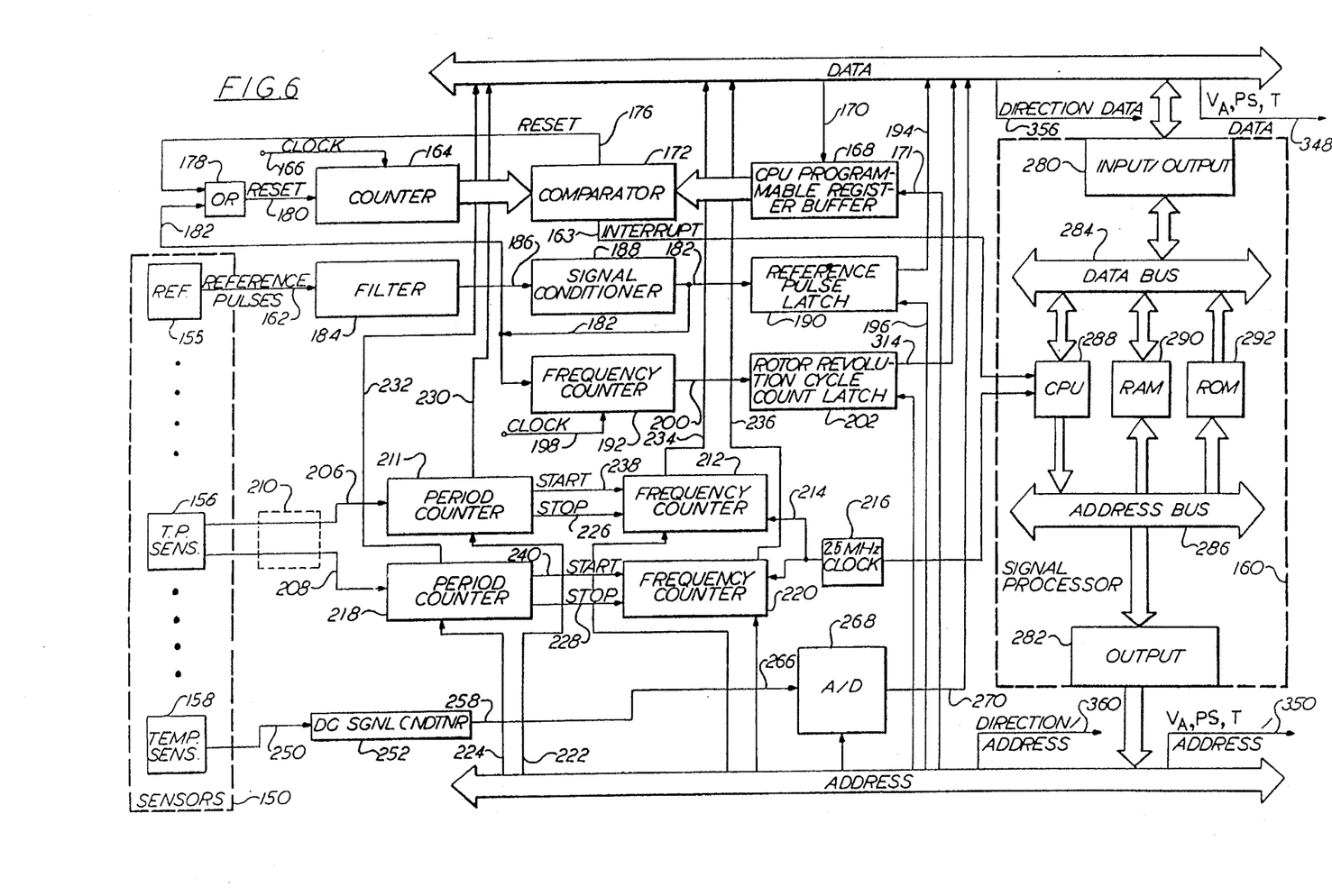
FIG. 6 is a simplified block diagram illustration of hardware which can be utilized in carrying out the sensing, sampling and signal processing steps of FIG. 2, as modified by FIGS. 4, 5 and 7, according to the teachings of FIG. 3, wherein direct sensing of static pressure is avoided and direct sensing of free air stream temperature may be avoided.

FIG. 6 shows hardware for carrying out the present invention and is very similar to FIG. 6 of U.S. Pat. No. 4,893,261 except omitting the altimeter (total pressure) sensor 156 thereof, the associated DC signal conditioner 256 and the analog multiplexer 262 since, according to the present invention, it is unnecessary to actually sense static pressure and without such a sensor, the analog multiplexer 262 is unnecessary since the temperature sensor 158 (which can also be omitted) can provide its sensed signal after DC conditioning directly to the analog-to-digital (A/D) converter 268.

As explained previously, since the present invention teaches how to determine free airstream temperature without sensing temperature, the temperature sensor 158 of U.S. Pat. No. 4,893,261 and as shown in FIG. 6 hereof may be omitted, at least for the case where the user determines that it is unnecessary to sense free airstream temperature for the case where the aircraft velocity is zero. On the other hand, as shown in the bottom part of FIG. 3, some users may wish to provide a temperature sensor for the case where $V_A=0$. For that reason, the temperature sensor 158 shown in FIG. 6 of U.S. Pat. No. 4,893,261 has been retained in FIG. 6 hereof along with its DC signal conditioner 252 and analog/digital converter 268.

Sensors 150 of FIG. 6 may include a plurality of individual sensors 155, . . . , 156, . . . , 158, which provide a plurality of sensed signals to a number of signal conditioning entities, to be described subsequently, which generally may be thought of as being within a sampling unit (boundaries not shown) for carrying out the sampling function 12 shown in FIG. 2. Such a sampling unit includes everything shown in FIG. 6 except for the sensors 150, the signal processor 160 and the data and address buses at the top and bottom, respectively of the figure. The data and address buses are not necessarily present in the hardware embodiment and are shown in the manner illustrated primarily for the sake of convenience. The signal processor 160 may be thought of as carrying out the signal processing step 19 of FIG. 2 of the prior art and including the inventive steps shown in FIGS. 3, 4 and 5 hereof. Thus, it will be understood that FIG. 6 is primarily directed to showing how the sampling function step 12 of FIG. 1 may be carried out in hardware.

As explained in column 12, beginning at line 35 of U.S. Pat. No. 4,893,261, the hardware of FIG. 5 provides "soft" synchronization as opposed to another possible approach of "hard" synchronization of FIG. 10 thereof. Hard synchronization will not be described in this specification and the reader is referred to the description thereof in U.S. Pat. No. 4,893,261 beginning at line 35 of column 12 through line 66 and also at column 17, beginning at line 14 through 17.

Figure 7:
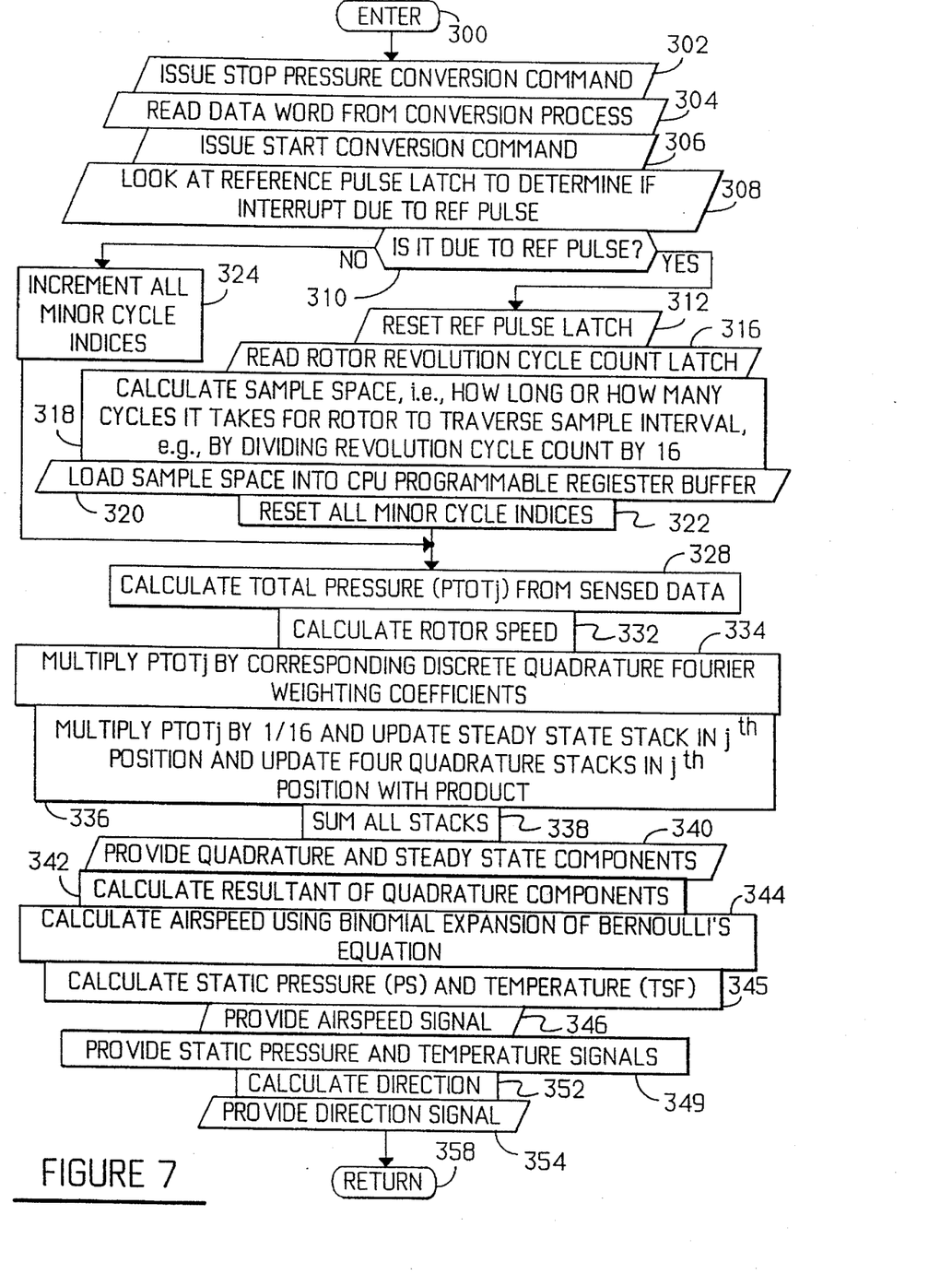
FIG. 7 shows a simplified flow chart illustration of a series of logical steps which may be carried out by the signal processor of FIG. 6.

The soft synchronization approach assumes that the rotor angular velocity remains constant during a given revolution and software is used to compute the time per pressure sample and this calculation is used to synchronize the pressure samples. Other methods are also certainly possible. For the "soft" synchronization method carried out by the embodiment of FIG. 6, the time per pressure sample is calculated by software resident in the signal processor 160. Based on this calculation, the hardware of FIG. 6 generates interrupts on a line 163 which tell the processor when to read the pressure. The flow chart of FIG. 7 is entered every time the signal processor receives such an interrupt. FIG. 7 shows steps which may be used to carry out the steps shown in FIGS. 3–5 on the processor of FIG. 6.

In order to measure the time per pressure sample interval, i.e., how long it takes the rotor, e.g., to sweep out an angle of $\pi/8$, a counter 164 counts the cycles of a high frequency clock signal provided on a line 166. Software within the signal processor 160 calculates the expected time elapsed per pressure sample during each revolution in terms of cycles of the high frequency clock. The calculation is based on the time of the last revolution. When this calculation is completed, the number is stored in a buffer latch 168 via a data line 170 from the signal processor 160 as loaded by a signal on a line 171. The output of the counter 164 is compared in a comparator 172 to the contents of the buffer latch 168. When the two numbers agree, an interrupt is generated on the line 163 to the signal processor 160 and the counter 164 is reset by means of a signal line 176 to an OR gate 178 which transmits the reset signal on a line 180 to the counter 164. The counter may also be reset by means of a filtered and conditioned reference pulse signal on a line 182. The reset signals on line 176 correspond in number to the number of samples taken per revolution. The reset signal on line 182 is provided once per revolution. Thus, once every "m" repetitions of the reset signal on line 176 the reference signal on line 182 will coincide with the reset signal.

The reference pulses on line 162 are provided to a filter reference pulse signal on a line 186 to a signal conditioner 188. The signal conditioned reference pulse on line 182 is provided to the OR gate 178, to a reference pulse latch 190 and to a frequency counter 192. The reference pulse latched in latch 190 is read by the signal processor 160 via a data line 194. The processor reads the latch 190 in order to determine when the rotating member has recently crossed the reference position. Once it is determined by the processor that this has occurred, the processor will then reset the latch via an address line 196.

The time between the reference pulses on line 162 is measured in order to determine rotor RPM. In order to measure the time the counter 192 will count periods of a fixed frequency clock signal on line 198 from one reference pulse to the next. The counter 192 output on line 200 is latched in a rotor revolution cycle count latch 202. The frequency counter 192 is reset and restarted by the signal on line 182, 192.

Total pressure frequency is measured by counting periods i.e., cycles, of a pressure signal on a line 206 from a pressure sensor 156. This sensor provides the signal on line 206 as a function of pressure and which also happens to depend on temperature for the particular sensor selected for one embodiment. The sensor 154 also provides a frequency signal on a line 208 which is purely dependent on temperature of the pressure sensor and is used only for the pressure sensor compensation described above. A set of slip rings 210 may typically be used in a helicopter application to transfer the signal from a rotating rotor to a helicopter fuselage which is stationary with respect thereto. These two signals 206, 208 may be used in the mapping step 20 of FIG. 1 to determine a proper temperature curve 63 of FIG. 2 of U.S. Pat. No. 4,893,261, for example, based on the sensed temperature indicated by the signal on line 208 of FIG. 6 and the sensed frequency indicated by the signal on line 206.

Staying now with FIG. 6, a period counter 211 counts the number of cycles to occur of the frequency modulated signal on line 206 from the pressure sensor and a frequency counter 212 simultaneously counts periods of a clock signal on a line 214 provided by a fixed, high frequency clock, such as a 25 megahertz clock signal source 216.

A period counter 218 and a frequency counter 220 perform similar functions in connection with measuring the respective number of cycles to occur of the signal on the line 208 from the temperature part of the sensor 154 and the 25 megahertz clock 216. Every time that an interrupt signal on line 163 is sent to the signal processor 160, the signal processor will provide an interrupt to each of the period counters 210, 218 on signal lines 222, 224, respectively. This will stop the counts in each of the period counters 210, 218 while immediately or almost immediately thereafter STOP signals will be sent on lines 226, 228, respectively, to the frequency counters 212, 220. The counts of both the period counters 210, 218 and the frequency counters 212, 220 are read over data lines 230, 232, 234, 236 by the signal processor 160. Start signals on lines 238, 240 are then sent to the frequency counters to restart the 25 megahertz cycle count. The period counters 210, 218, are restarted at substantially the same time. These counts are utilized in the signal processor in a manner to be described subsequently in connection with FIG. 7.

As explained previously, some users may wish to measure outside air temperature and such may be done by means of the temperature sensor 158 which may be, for example, a Rosemount model 102-AV-ICK-510-BF-56 resistive probe with 500 ohms equal to 0° C. In such a case, the temperature sensor 158 is excited by a source (not shown) and in turn provides a temperature signal on a line 250 to a DC signal conditioner 252. The DC signal conditioner 252 provides a conditioned temperature sensor on a line 258 through an analog-to-digital converter 268 which provides a digital temperature signal on a line 270 to the signal processor 160.

The signal processor 160 is shown comprised of a typical general purpose signal processor architecture having an input/output port 280, and output port 282, a data bus 284, an address bus 286, a central processing unit (CPU) 288, a random access memory (RAM) 290 and a read only memory (ROM) 292. Of course, a special purpose or dedicated processor will serve equally well.

The ROM 292 will typically store a sequence of logical step to be performed according to a preselected program such as is illustrated in FIG. 7, to be described below. The RAM is utilized to store intermediate values which need only be stored temporarily and which will normally disappear upon removal of power. The CPU 288 is of course responsible for controlling the sequence of logical steps outlined in FIG. 7 and for inputting and outputting various signals at the proper times.

Referring now to FIG. 7, a series of logical steps are there illustrated, in simplified form, for carrying out the sampling step 12 illustrated in FIG. 1 in conjunction with the hardware of FIG. 6 and, in addition, for carrying out the discrete Fourier analysis 26 and aircraft velocity and direction determinations 37, 34 of FIG. 2 of the prior art as modified by the new steps of FIGS. 3–5 of the present invention. Although not explicitly described in connection with FIG. 7, it will be understood that the mapping function of FIG. 2, as well as other mapping functions, may be carried out in the signal processor as well.

After entering in a step 300, after receiving an interrupt on line 163 of FIG. 6, a stop pressure conversion command is issued on lines 222, 224 of FIG. 6 to the period counters 210, 218. This causes the period counters to stop counting pressure and temperature cycles and to issue stop commands on lines 226, 228 to the frequency counters 212, 220.

A step 304 is next executed in which the counts held within the counters 210, 218, 212, 220 are read on data word lines 230, 232, 234, 236 by the signal processor 160 via the input/output port 280. Once the data words have been read, a start conversion command is issued on lines 222, 224, as indicated in a step 306, which causes the counters 210, 218 to issue START commands on lines 238, 240 and the counters 210, 218, 212, 220 start counting again. The signal processor then executes a step 308 in which the contents of the reference pulse latch 190 of FIG. 6 is examined to determine, as indicated in a step 310, whether the interrupt was due to a reference pulse or not. This information is read out over line 194 of FIG. 6. If it is determined that the interrupt was due to a reference pulse on line 162 of FIG. 6 then the reference pulse latch 190 is reset by the signal processor 160 using signal line 196 as indicated by step 312 of FIG. 7. This is done immediately in order to clear the reference pulse latch prior to the end of the next sample period.

The signal processor then reads the contents of the rotor revolution cycle count latch 202 of FIG. 6 over a data line 314 as indicated in a step 316. Having read this information, the signal processor is now able to calculate how many cycles of the clock signal on line 198 it takes for the rotating member to traverse a selected sample interval, for example, by dividing the revolution cycle count by 16, for a case where 16 equal samples are taken per revolution, as indicated in a step 318.

The results of that calculation are then loaded into the CPU programmable register buffer 168 of FIG. 6 via data line 170, as indicated in a step 320 of FIG. 7. The signal processor then resets all minor cycle indices, as indicated in a step 322. This would include the Fourier coefficients $KA_j$ and $KB_j$ of FIG. 4. It would also include the stacks 72, 80, 94, 112, 124 among other things.

If a determination was made in step 310 that the interrupt which caused entry into the program at step 300 was not due to a reference pulse on line 162, then a step 324 would have been executed in lieu of steps 312, 316, 318, 320, 322, in which all subrevolution indices are incremented. These indices function as labels for the incoming pressure samples on a per revolution basis.

In either event, a step 328 is next executed in which a calculation of the total pressure for the sample space of interest is made. The result of that calculation may be thought of as being equivalent to providing the $PTOT_j$ signal on line 28a of FIG. 4. This may be an average pressure signal over the interval.

The signal processor 160 next executes a step 332 in which the angular velocity of the rotating member is calculated for use in the next sample space calculation.

A step 334 is next executed in which the $PTOT_j$ total pressure calculation made in step 328 is multiplied by a corresponding discrete quadrature Fourier weighting coefficient for two separate quadrature components for each harmonic as indicated in FIG. 4 by the multiplication steps 78, 92, 110, 122.

A step 336 is next executed in which $PTOT_j$ is multiplied by 1/m, in which m equals the number of subrevolution intervals; the steady state stack is updated in the jth position and also the two quadrature stacks for each harmonic are updated in the jth positions with the products obtained in step 334. A step 338 is next executed in which the contents of all stacks are summed as indicated by steps 74, 82, 96, 114, 126 of FIG. 4. Quadrature component signals are provided on lines 32a, 32b, 32c, 32d and a steady state component signal is provided on line 30a of FIG. 4 as indicated by a step 340 in FIG. 7.

A step 342 is next executed in which a resultant for each harmonic is calculated and a resultant signal provided on lines 108, 136 of FIG. 5.

A calculation of airspeed is next made in a step 344 using a binomial expansion of Bernoulli's equation as indicated in FIG. 5 by the calculation steps 138, 146.

A step 345 is next executed in which static pressure and temperature are calculated as shown, for example, in the steps 154 and 155a of FIG. 7.

An airspeed signal is next provided as indicated in a step 346 on a signal line 348 of FIG. 6 (corresponding to the signal on line 150 of FIG. 5) for transmission to an external unit such as via an ARINC transmitter (not shown) as indicated by an address signal on a line 350 in FIG. 6.

A step 349 is next executed in which static pressure and temperature signals are provided as indicated by the signal lines 348, 350 of FIG. 6.

A direction calculation is next executed in a step 352 as similarly indicated in the step 34 of FIG. 1. A direction signal is provided as indicated by a step 354, on line 36a of FIG. 3 or line 356 of FIG. 6 and a return is then made in a step 358. The direction data is addressed in the external unit by means of a direction signal shown on a line 360 of FIG. 6.

The logical steps illustrated in FIG. 7 will be re-entered in step 300 upon reception of the next to occur interrupt signal on line 163.

It is also possible to determine other aircraft airdata parmaters from the above-described signal processing technique. For example, pressure altitude, pressure altitude rate, mach number, etc. can be determined. Some examples of these are shown by the equations listed below which are standard air data equations as may be found, for example, in various NASA publications, including NASA Technotes D822 August 1961:

$$\text{Total Pressure } (P_t) \ P_t = P_s \left[ 1 + \frac{KV_{AC}^2}{T_{FAT}} \right]^{3.5}$$

$$\text{Pressure altitude } (Hp) \ H_p = f(P_s)$$

-continued

Mach number (M) $\frac{P_s}{P_t} = (1 + 0.2 M^2)^{-3.5}, M \leq 1$

Mach number (M) $\frac{P_s}{P_t} = \frac{1}{1.2 M^2} \left[ \frac{7 M^2 - 1}{7.2M} \right]^{2.5}, M > 1$ True airspeed ($V_T$) $V_T = 38.96695\ M\ (T_{fat})^{0.5}$ Impact pressure (Qc) $Qc = P_t - P_s$ Pressure altitude rate (Hp) $\dot{H}p = \frac{dHp}{dt}$ Calibrated airspeed (Vc) $Qc = P_{so} \left[ \left[ 1 + 0.2 \left[ \frac{Vc}{Co} \right]^2 \right]^{3.5} - 1 \right], Vc \leq C_o$ $P_{so} = 29.9213$ in. Hg.

Co = 661.4786 Knots $Qc = P_{so} \left[ \frac{166.9216 \left[ \frac{Vc}{Co} \right]^7}{\left[ 7 \left[ \frac{Vc}{Co} \right]^2 - 1 \right]^{2.5}} - 1 \right], Vc > C_0$ Density ratio (sigma) $sigma = \frac{rho}{rho_o} = \frac{9.630276\ P_s}{T_{fat}}$ Free air temperature ($T_{fat}$) $T_{fat} = \frac{T_t}{1 + 0.2\ M^2}$ Total temperature ($T_1$) $T_t = \frac{T_{ti}}{1 - eta} - 0.555$ DEG. K.

Although the invention has been shown and described with respect to a best mode embodiment thereof, it should be understood by those skilled in the art that the foregoing and various other changes, omissions and additions in the form and detail thereof may be made therein without departing from the spirit and scope of the invention.

We claim:

1. A method of providing an airspeed signal indicative of a velocity of an aircraft relative to an air mass surrounding the aircraft relative to a frame of reference fixed in the aircraft, the aircraft having at least one sensor for providing a sensed pressure signal as a sensed air data parameter that is indicative of pressure at a rotating member and a sensed periodic reference signal indicative of the rotating member periodically passing a reference position relative to the frame of reference, comprising the steps of:

selectively sampling the magnitude of the sensed pressure signal according to the position of the rotating member for each of a plurality of subrevolution intervals, and providing sampled pressure signals having magnitudes indicative of said magnitude of the sensed pressure signal during each of said plurality of subrevolution intervals, as determined with respect to the sensed periodic reference signal;

providing, in response to said sampled pressure signals, multiple order harmonic component pressure signals having magnitudes indicative of multiple order harmonic component representations of the pressure at the rotating member; and utilizing the multiple order harmonic component pressure signals for determining aircraft velocity, for providing the airspeed signal having a magnitude indicative thereof thereby using only one sensed air data parameter in said method of providing said airspeed signal.

2. The method of claim 1, wherein the multiple order harmonic component pressure signals are indicative of steady state, first harmonic and second harmonic components of the sensed pressure signal.

3. The method of claim 1, further comprising the step of determining static pressure from the multiple order harmonic component pressure signals for providing a static pressure signal.

4. The method of claim 1, further comprising the step of determining a temperature component of the sensed pressure signal.

5. An apparatus for providing an airspeed signal indicative of a velocity of an aircraft relative to an air mass surrounding the aircraft relative to a frame of reference fixed in the aircraft, the aircraft having a plurality of sensors for providing a sensed pressure signal as a sensed air data parameter that is indicative of pressure on a rotating member and a sensed periodic reference signal indicative of the rotating member periodically passing a reference position relative to the frame of reference, comprising:

pressure sampling means for selectively sampling the magnitude of the sensed pressure signal according to the position of the rotating member for each of a plurality of subrevolution intervals determined with respect to the sensed periodic reference signal, said sampling means providing sampled pressure signals having magnitudes indicative of said magnitude of the sensed pressure signal during each of said plurality of subrevolution intervals;

multiple order harmonic component pressure determination means, responsive to said sampled pressure signals, for providing multiple order harmonic component pressure signals having magnitudes indicative of multiple order harmonic component representations of the pressure on the rotating member; and aircraft velocity determination means, responsive to said multiple order harmonic component pressure signals, for providing the airspeed signal having a magnitude indicative thereof thereby using only one sensed air data parameter in said apparatus for providing an airspeed signal.

6. The apparatus of claim 5, wherein the multiple order harmonic component pressure signals are indicative of steady state, first harmonic and second harmonic components of the sensed pressure signal.

7. The apparatus of claim 6, wherein the apparatus further comprises static pressure determination means, responsive to the multiple order harmonic component pressure signals, for providing a static pressure signal indicative of a static pressure at the rotary member.

8. The apparatus of claim 6, wherein the apparatus further comprises free airstream temperature determination means, responsive to the multiple order harmonic component pressure signals, for providing a free airstream temperature signal indicative of a free air temperature at the rotary member.

9. The apparatus of claim 8, wherein the free airstream temperature determination means determines temperature from the multiple order harmonic pressure component signals for providing the free airstream temperature signal.

10. A method for determining air data parameters for an aircraft, comprising the steps of:

sensing total pressure at a selected position on a rotating member of the aircraft, for providing a sensed total pressure signal as a sense air data parameter; and processing the sensed total pressure signal for providing at least two air data parameter signals from among a plurality of air data parameter signals including an aircraft velocity signal indicative of aircraft velocity relative to an air mass, a static pressure signal indicative of static pressure of the air mass, and a free airstream temperature signal indicative of free airstream temperature of the air mass, thereby using only one sensed air data parameter in said method of determining air data parameters for an aircraft.

11. The method of claim 10, wherein said step of processing the sensed total pressure signal comprises the steps of providing, in response to said sensed total pressure signal, multiple order harmonic component pressure signals having magnitudes indicative of harmonic component representations of the total pressure on the rotating member and utilizing the multiple order harmonic component pressure signals for determining said at least two airdata parameter signals.

12. The method of claim 11, wherein the multiple order harmonic component pressure signals are indicative of steady state, first harmonic and second harmonic components of the sensed total pressure signal.

13. An apparatus having a rotary member, comprising:
multiple order harmonic component pressure determination means, and responsive to a sensed pressure signal indicative of a sensed pressure at the rotary member, for providing a first order harmonic component pressure signal indicative of a first order harmonic component of the sensed pressure at the rotary member, and further providing a second order harmonic component pressure signal indicative of a second order harmonic component of the sensed pressure at the rotary member; and
velocity determination means, responsive to the first order harmonic component pressure signal, and further responsive to the second order harmonic component pressure signal, for providing a velocity determination signal indicative of the velocity of the apparatus.

14. An apparatus according to claim 13, wherein said multiple order harmonic component pressure determination means further provides a steady state component pressure signal indicative of a steady state component of the sensed pressure at the rotary member; and
wherein the apparatus further comprises static pressure determination means, responsive to the first order harmonic component pressure signal, and further responsive to the second order harmonic component pressure signal, and further responsive to the steady state component pressure signal, for providing a static pressure signal indicative of a static pressure at the rotary member.

15. An apparatus according to claim 13, wherein said harmonic component pressure determination means further provides a steady state component pressure signal indicative of a steady state component of the sensed pressure at the rotary member; and
wherein the apparatus further comprises free airstream temperature determination means, responsive to the first order harmonic component pressure signal, and further responsive to the second order harmonic component pressure signal, and further responsive to the steady state component pressure signal, for providing a free airstream temperature signal indicative of a free airstream temperature at the rotary member.

16. An apparatus according to claim 14, wherein the apparatus further comprises free airstream temperature determination means, responsive to the first order harmonic component pressure signal, and further responsive to the second order harmonic component pressure signal, and further responsive to the steady state component pressure signal, for providing a free airstream temperature signal indicative of a free airstream temperature at the rotary member.

* * * * *

UNITED STATES PATENT AND TRADEMARK OFFICE
CERTIFICATE OF CORRECTION

PATENT NO. : 5,610,845
DATED : March 11, 1997
INVENTOR(S) : Slabinski et al

It is certified that error appears in the above-indentified patent and that said Letters Patent is hereby corrected as shown below:

At column 6, line 8, please cancel $$2KV_R V_A \sin(\omega_R t + \Phi_1) = \frac{KV_A^2}{2} \cos(2\omega_R t + 2\phi_2)$$

and substitute therefor $$2KV_R V_A \sin(\omega_R t + \Phi_1) - \frac{KV_A^2}{2} \cos(2\omega_R t + 2\phi_2) \quad ; \text{ and}$$

at column 17, line 30, please cancel "Total temperature $(T_1)$ $T_t$" and substitute therefor --Total temperature $(T_t)$ $T_t$--.

Signed and Sealed this

Twenty-third Day of September, 1997

Attest:

BRUCE LEHMAN

Attesting Officer

Commissioner of Patents and Trademarks